United States Patent
Binar

(10) Patent No.: US 7,979,058 B2
(45) Date of Patent: Jul. 12, 2011

(54) METHOD AND SYSTEM FOR THE TRANSMISSION OF DATA THAT HAS NOT BEEN EXPLICITLY REQUESTED IN A MOBILE RADIO SYSTEM

(75) Inventor: Simon Binar, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/497,959

(22) PCT Filed: Dec. 3, 2002

(86) PCT No.: PCT/DE02/04423
§ 371 (c)(1),
(2), (4) Date: Jun. 7, 2004

(87) PCT Pub. No.: WO03/055177
PCT Pub. Date: Jul. 3, 2003

(65) Prior Publication Data
US 2005/0079860 A1    Apr. 14, 2005

(30) Foreign Application Priority Data
Dec. 7, 2001  (DE) .................. 101 60 077

(51) Int. Cl.
*H04M 3/42* (2006.01)
*H04B 7/216* (2006.01)

(52) U.S. Cl. ............ 455/414.1; 455/412.1; 455/414.2; 370/342

(58) Field of Classification Search ......... 455/437, 455/453, 412.1, 421.1, 405, 456.3, 560, 412.2, 455/422, 550, 412, 419, 414, 466, 456, 414.1; 714/748; 717/178; 370/235, 338, 412, 445; 705/26, 14
See application file for complete search history.

(56) References Cited

U.S. PATENT DOCUMENTS

| | | | | |
|---|---|---|---|---|
| 5,890,075 A | * | 3/1999 | Cyr et al. ................. | 455/560 |
| 6,044,258 A | * | 3/2000 | Abdella .................... | 455/405 |
| 6,115,611 A | * | 9/2000 | Kimoto et al. ............ | 455/456.3 |
| 6,496,979 B1 | * | 12/2002 | Chen et al. ............... | 717/178 |
| 6,501,732 B1 | * | 12/2002 | Xu et al. .................. | 370/235 |
| 6,546,250 B1 | * | 4/2003 | Turcotte et al. .......... | 455/437 |
| 6,557,134 B2 | * | 4/2003 | Bims et al. ............... | 714/748 |
| 6,628,935 B1 | * | 9/2003 | Lawrence ................ | 455/412.1 |
| 6,636,733 B1 | * | 10/2003 | Helferich ................. | 455/412.2 |

(Continued)

FOREIGN PATENT DOCUMENTS

| | | |
|---|---|---|
| EP | 1061701 A1 | 12/2000 |
| JP | 10276311 A | 10/1998 |
| JP | 200099525 | 4/2000 |
| JP | 2000209261 A | 7/2000 |
| JP | 2001145168 | 5/2001 |
| JP | 2001290694 A | 10/2001 |
| KR | 2000-0058858 | 10/2000 |

(Continued)

OTHER PUBLICATIONS

XP-002240864—WAP Forum—"Push OTA Protocol Version 25-04-01" pp. 1-44.

*Primary Examiner* — Charles N Appiah
*Assistant Examiner* — Kiet Doan
(74) *Attorney, Agent, or Firm* — King & Spalding L.L.P.

(57) ABSTRACT

A system and method are provided for transmitting data that has not been explicitly requested in a mobile radio system which includes an application computer, a transmission network, and a mobile radio receiver. The mobile radio receiver indicates to the transmission network how much storage space is available in the mobile radio receiver for storing data.

8 Claims, 2 Drawing Sheets

U.S. PATENT DOCUMENTS

| | | | |
|---|---|---|---|
| 6,909,890 B2 * | 6/2005 | Iyer | 455/418 |
| 7,050,445 B1 * | 5/2006 | Zellner et al. | 370/412 |
| 7,076,244 B2 | 7/2006 | Lazaridis et al. | 455/414.2 |
| 2002/0002510 A1 * | 1/2002 | Sharp et al. | 705/26 |
| 2002/0004381 A1 * | 1/2002 | Theimer | 455/412 |
| 2002/0012335 A1 | 1/2002 | Miya et al. | 370/342 |
| 2002/0019965 A1 * | 2/2002 | Bims et al. | 714/748 |
| 2002/0032024 A1 * | 3/2002 | Namba et al. | 455/419 |
| 2002/0049071 A1 * | 4/2002 | Bjorn | 455/550 |
| 2002/0123335 A1 * | 9/2002 | Luna et al. | 455/419 |
| 2003/0018524 A1 * | 1/2003 | Fishman et al. | 705/14 |
| 2003/0026231 A1 * | 2/2003 | Lazaridis et al. | 370/338 |
| 2003/0096596 A1 * | 5/2003 | Sini et al. | 455/412 |
| 2003/0186724 A1 * | 10/2003 | Tsutsumi et al. | 455/561 |
| 2003/0189913 A1 | 10/2003 | Kim | 370/338 |

FOREIGN PATENT DOCUMENTS

| | | |
|---|---|---|
| WO | 98/00994 | 1/1998 |
| WO | 99/46947 | 9/1999 |
| WO | 9963709 | 12/1999 |
| WO | 0133782 | 5/2001 |
| WO | WO 01/31946 | 5/2001 |
| WO | WO 01/43390 | 6/2001 |
| WO | WO0163506 | 8/2001 |
| WO | 0186547 | 11/2001 |
| WO | WO 01/82638 | 11/2001 |
| WO | 02/071098 | 9/2002 |

* cited by examiner

METHOD AND SYSTEM FOR THE TRANSMISSION OF DATA THAT HAS NOT BEEN EXPLICITLY REQUESTED IN A MOBILE RADIO SYSTEM

BACKGROUND OF THE INVENTION

The volume of information, such as data or multimedia content, for example, exchanged in mobile radio networks based on packet transmission is growing all the time. Since requesting information using the keypad of a mobile radio receiver is not very convenient, it is possible to request the desired information using so-called push services. In this case, information is automatically delivered by a server to the mobile radio receiver without the latter having explicitly requested the specific data.

The mobile radio user typically specifies a group of topics or a general information field, according to which the desired information is then delivered to the user on his/her mobile radio receiver. In technical terms, push services are network-initiated point-to-point services.

The basic design of a possible push service system is described in the TR 23.974 specification of the 3GPP (3rd Generation Partnership Project) organization.

Problems emerge, however, because the information transmitted using the push service is not delivered to the mobile radio user following an actual request by the user. Mobile radio receivers only have a limited storage capacity for incoming information. Problems therefore can arise because the sender of the information does not know whether he/she can still send the information to the mobile radio receiver.

Incoming information is usually indicated by the mobile radio receiver with the aid of an acoustic signal. If information is continually arriving in the mobile radio receiver, this constitutes an annoyance for the mobile radio subscriber. It is therefore desirable to find a way of receiving push services with which the user of this service is not constantly disturbed by incoming messages.

Moreover, with known push services there is the problem that, when a large volume of data is received, the user has difficulty deciding which data is important for him/her and which is less important. It is therefore desirable for the user of push services to receive the data in accordance with its relative importance.

An object of the present invention is, therefore, to provide an improved system for the transmission of data that has not been explicitly requested in a mobile radio system.

Accordingly, the system of the present invention for the transmission of data that has not been explicitly requested in a mobile radio system includes an application computer, a transmission network and a mobile radio receiver. The application computer may be, for example, an application server which sends the push services to the mobile radio receiver via a transmission network; for example, an Internet protocol connection.

The transmission network is a network which enables the connection between the application computer and the mobile radio receiver. The transmission network may be, for example, a GPRS (General Packet Radio Service) network.

The mobile radio receiver is a terminal which supports the use of push services.

If information is to be forwarded from the application computer to the mobile radio receiver, it is only sensible if the transmission network knows how much storage space is available to the mobile radio receiver to store push service information. For this reason, the mobile radio receiver indicates to the transmission network how much storage space is still available to it for storing the push services.

In a preferred embodiment of the present invention, the mobile radio receiver also indicates to the transmission network when no more storage space for data is available in the mobile radio receiver.

If the need should nevertheless arise to send information to the mobile radio receiver even though storage space is no longer available in the mobile radio receiver, there are basically two options. On the one hand, information not sent can be buffered. As soon as storage space becomes available in the mobile radio receiver once again, the buffered information is forwarded to the mobile radio receiver.

On the other hand, according to one embodiment of the present invention, it is also possible for the mobile radio receiver to release already occupied storage areas for overwriting with received information. This is conceivable, for example, for storage areas to which less relevant information has been written. The user has the option here of defining which information he/she considers less important, or which particular storage areas are to be released for overwriting with more important information, respectively.

In another preferred embodiment of the present invention, the transmission network has a storage area for buffering data received from the application computer. The storage area may be any known type of known storage system. The information of the push service is forwarded from the application computer to the transmission network. If it is not immediately possible to forward the information to the particular mobile radio receiver, the information is buffered in the storage area. Thus, it is always possible to send data from the application computer to the transmission network. As soon as the mobile radio receiver is ready to receive again, the buffered data is forwarded from the storage area to the mobile radio receiver.

The forwarding of the buffered data depends on the information indicated by the mobile radio receiver. For instance, if the mobile radio receiver indicates to the transmission network that no storage is currently available for receiving information, then the storage area stores the data intended for the mobile radio receiver until the mobile radio receiver indicates to the transmission network that sufficient storage space is again available for receiving the data. The information is exchanged here via the air interface.

In a further preferred embodiment of the present invention, the transmission network has a network computer which initiates the transmission of data to the mobile radio receiver. The network computer receives from the mobile radio receiver information relating to its available storage capacity. The initiation of a transmission by the network computer is performed depending on the information indicated by the mobile radio receiver. The network computer thus executes certain control functions in the transmission system. The network computer knows which data is buffered in the storage area, or which data transmission to the mobile radio receiver has not yet been executed.

The present invention also relates to a system for the transmission of data that has not been explicitly requested in a mobile radio system, in which the mobile radio system includes an application computer, a transmission network and a mobile radio receiver, wherein the mobile radio receiver notifies the transmission network of information relating to the transmission of data.

In a preferred embodiment of the present invention, the information of the mobile radio receiver indicates to the transmission network when the data is to be sent to the mobile radio receiver. For this purpose, the transmission network is notified of a time window which is best for the data of the push service to be sent to the mobile radio receiver. The background of this is that the user does not want to be continually disturbed by receiving the push services. As a result of this procedure, the user always knows exactly when new push service data may arrive. In this case, the mobile radio subscriber determines the time of transmission via an input on his/her mobile radio receiver. It is also conceivable, however, for the network operator to determine the time of transmission; e.g., depending on the network load.

In another preferred embodiment of the present invention, the mobile radio receiver transmits the desired time of transmission of the data to a network computer, which initiates the transmission accordingly.

In a further preferred embodiment of the present invention, the information of the mobile radio receiver indicates to the transmission network the order in which the data is to be sent to the mobile radio receiver. If a user has subscribed to a number of push services, he/she can assign a particular value to each push service. If several push services arrive, the data is transmitted to the mobile radio receiver in accordance with their relative value; that is to say, with a higher or lower priority. For instance, it is possible to assign stock market information a higher priority than sports information. A new item of stock market information is then forwarded to the user more quickly than a new item of sports information. It is also possible for the network operator to specify the relative values.

The same applies analogously when a storage area is used to buffer information received from the application computer. The processing, or forwarding, of the buffered information is again performed on the basis of the relative values assigned to the push service to which the user has subscribed.

The buffered data is forwarded depending on the information indicated by the mobile radio receiver. The user thus determines in which way he/she wishes to receive the push services.

The network computer receives the information relevant for the time, or order, of transmission from the mobile radio receiver. The network computer thus executes certain control functions in the transmission system. For instance, it initiates the transmissions from the transmission network (i.e., the storage area), to the mobile radio receiver.

Additional features and advantages of the present invention are described in, and will be apparent from, the following Detailed Description of the Invention and the figures.

DETAILED DESCRIPTION OF THE INVENTION

Figure 1:
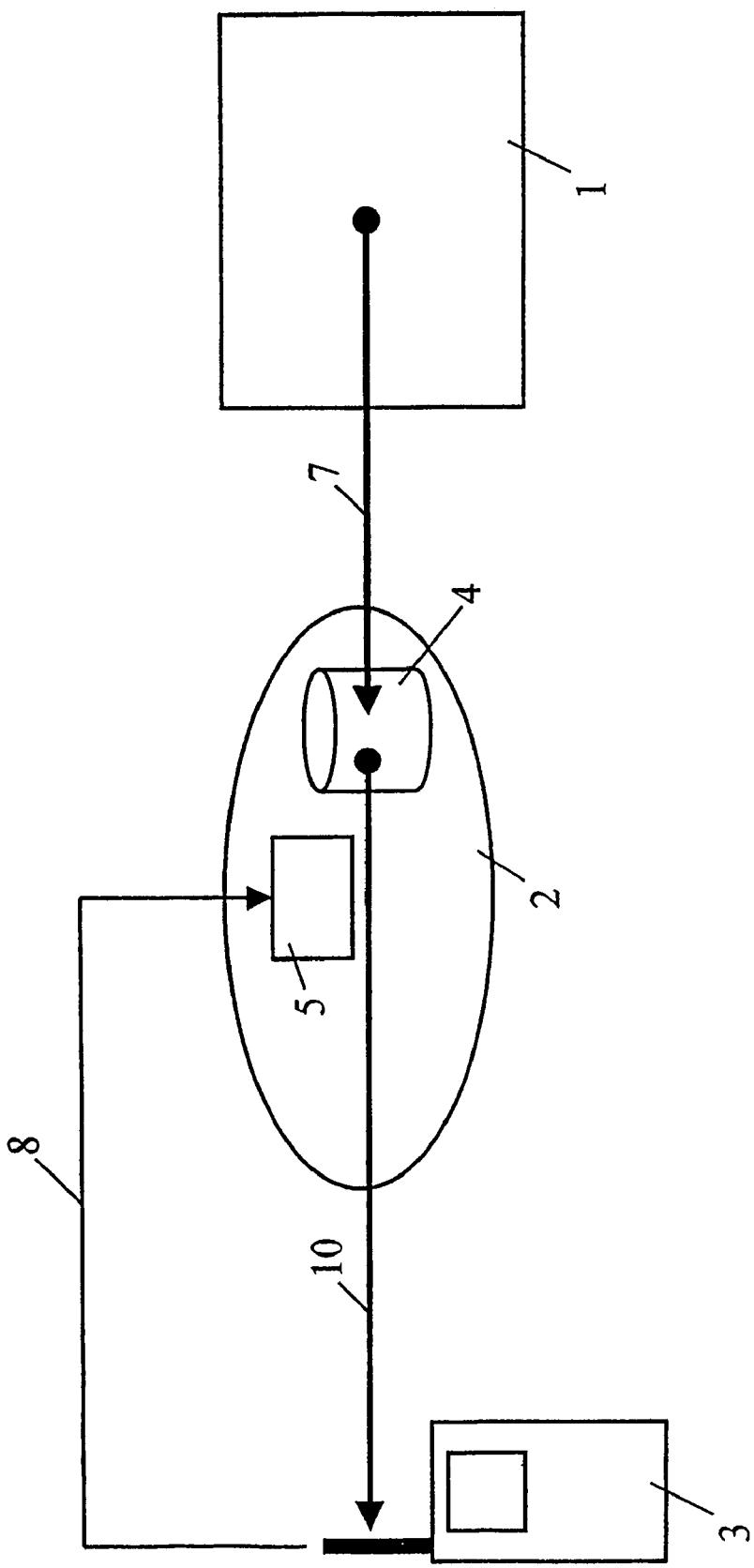
FIG. 1 shows a schematic representation of a system for the transmission of data that has not been explicitly requested in a mobile radio system.

FIG. 1 shows an application computer 1, a transmission network 2 having a storage area 4, and a network computer 5. FIG. 1 also shows a mobile radio receiver 3. Push service data is, as indicated by the arrow 7, sent from the application computer 1 to the transmission network 2. The data is then buffered in the storage area 4. As indicated by the arrow 8, the network computer 5 receives from the mobile radio receiver 3 information relating to the available storage capacity in the mobile radio receiver. Depending on this information, the data stored in the storage area 4 is sent, as shown by the arrow 10, to the mobile radio receiver 3.

If, for example, a large amount of information is to be sent from the application computer 1 to the transmission network 3, and the network computer 5 has learned from the mobile radio receiver 3 that the latter currently does not have sufficient storage space available for receiving the information of the application computer 1, the data is buffered in the storage area 4. As soon as sufficient storage space is once again available to the mobile radio receiver 3, (e.g., because the user has read old information and then deleted it), the information is sent to the network computer 5. Accordingly, network computer initiates a forwarding of the information buffered in the storage area 4 to the mobile radio receiver 3.

In addition, if the mobile radio receiver 3 indicates to the network computer 5 that there is no longer sufficient storage space available to it for receiving new information, it is possible for the mobile radio receiver 3 to release storage areas for overwriting with newly received data. It is also possible for information already read by the user, but which nevertheless continues to be stored in the mobile radio receiver, to be overwritten. The information as to which storage areas can be overwritten is forwarded to the network computer 5 under the user's control. The network computer 3 initiates the further transmission accordingly.

Figure 2:
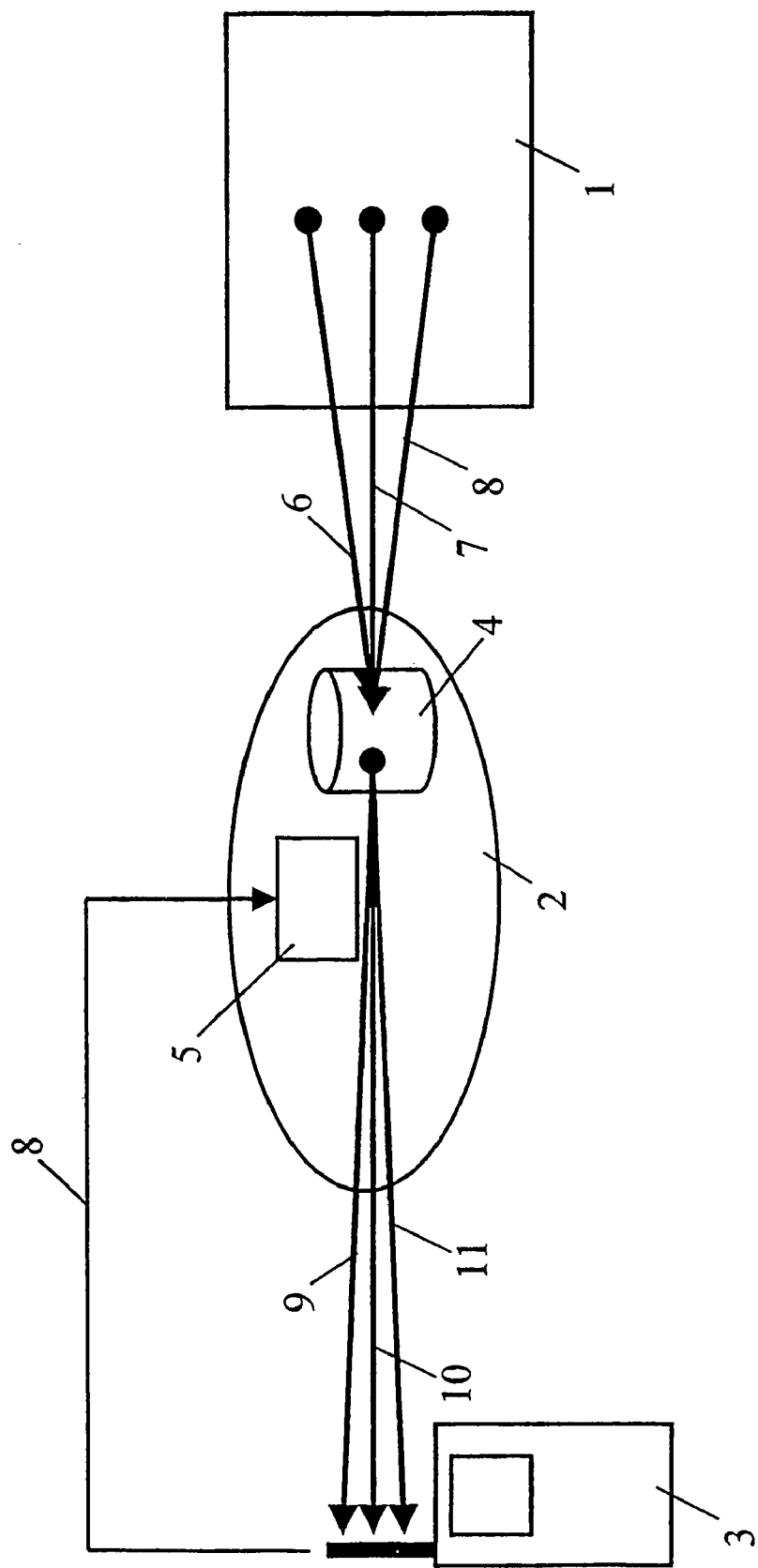
FIG. 2 shows a schematic representation of a system for the transmission of data that has not been explicitly requested in a mobile radio system in the case of transmission dependent on relative values.

FIG. 2 shows a further exemplary embodiment of the system according to the present invention for the transmission of data that has not been explicitly requested in a mobile radio system. The elements of application computer, transmission system, storage area, network computer and mobile radio receiver are represented in FIG. 2 analogously to those explained above with reference to FIG. 1. Arrows 6, 7, 8 indicate that information may arrive from the application computer 1 sequentially in the transmission network 2; i.e., the storage area 4.

In one exemplary embodiment, data buffered in the storage area 4 is sent sequentially in series from a particular point in time to the mobile radio receiver 3. As such, the first data stream 9 is sent first, followed by the data stream 10 and finally the data stream 11. In this case the user specifies to the network computer 5 via the mobile radio receiver 3 the time information relating to when he/she wishes to receive the data of the push service.

In another exemplary embodiment, data relating to different push service topics is sent from the application computer 1 to the transmission network 2. For instance, traffic bulletins are received first via the data stream 6. This is followed by weather reports via the data stream 7, and finally politics news via the data stream 8. The data is buffered in the storage area 4. Since weather information has the highest priority for the user, and politics news is more important to him/her than traffic bulletins, the user has accordingly notified the network computer 5 that, in the case of buffered information, he/she always wishes to receive the weather information first, then the politics news, and finally traffic bulletins. Accordingly, weather information is sent first via the data stream 9, then politics news is sent via the data stream 10, and finally traffic bulletins are sent via the data stream 11 from the storage area 4 to the mobile radio receiver 3.

This procedure also may be configured for use only if buffering is used because of a lack of storage capacity in the mobile radio receiver 3. Furthermore, it is possible for push service information always to be buffered for a given period of time so that a selection based on its relative importance may be made. Moreover, a combination with a time-dependent transmission is accordingly also possible.

Although the present invention has been described with reference to specific embodiments, those of skill in the art will recognize that changes may be made thereto without departing from the spirit and scope of the present invention as set forth in the hereafter appended claims.

The invention claimed is:

1. A system for transmitting push service data which has not been explicitly requested in a mobile radio system, comprising:
   a mobile radio receiver in communication with a transmission network, the mobile radio receiver indicating information to the transmission network relating to an order in which different types of push service data, which has not been explicitly requested by the mobile radio receiver, are to be transmitted to the mobile radio receiver, such that different types of push service data transmitted from an application computer and buffered in a storage area of the transmission network, and which has not been explicitly requested by the mobile radio receiver, are forwarded to the mobile radio receiver in the order indicated by the mobile radio receiver to the transmission network,
   wherein the transmission network includes a network computer for initiating the transmission of the push service data, which has not been explicitly requested by the mobile radio receiver, to the mobile radio receiver, and
   wherein the initiation is performed depending on the information indicated by the mobile radio receiver.

2. The system for transmitting data as claimed in claim 1, wherein the information indicates to the transmission network a time when the data, which has not been explicitly requested, is to be transmitted to the mobile radio receiver.

3. A method for transmitting data which has not been explicitly requested in a mobile radio system, the method comprising the steps of:
   determining the capacity of storage areas in a mobile radio receiver;
   determining what data in the storage areas is subject to being overwritten as a result of a push operation, by performing a step selected from the group consisting of (i) designating at least one of said storage areas for writing over existing data when new data, which has not been explicitly requested, is received and (ii) designating existing data in at least one of said storage area as subject to overwriting when new data, which has not been explicitly requested, is received;
   indicating information to a transmission network, from the mobile radio receiver, regarding how much storage space is available for storing data in the storage areas of the mobile radio receiver; and
   enabling the mobile radio receiver to release existing data or storage areas for overwriting with new data, which has not been explicitly requested, received via the push operation from the transmission network,
   wherein the transmission network includes a network computer for initiating the transmission of the new data, which has not been explicitly requested, to the mobile radio receiver, and
   wherein the initiation is performed depending on the information indicated by the mobile radio receiver.

4. The method for transmitting data as claimed in claim 3, the method further comprising the step of indicating information to the transmission network, from the mobile radio receiver, when no storage space is available for storing data, which has not been explicitly requested, in the storage areas of the mobile radio receiver.

5. The method for transmitting data as claimed in claim 3, the method further comprising the step of providing the transmission network with a storage area for buffering data, which has not been explicitly requested, received from the application computer.

6. The method for transmitting data as claimed in claim 5, the method further comprising the step of transmitting the buffered data, which has not been explicitly requested, to the mobile radio receiver depending on the information indicated by the mobile radio receiver.

7. A method for transmitting data which has not be explicitly requested in a mobile radio system, the method comprising the steps of:
   establishing communication between a mobile radio receiver and a transmission network; and
   indicating information to the transmission network, by the mobile radio receiver, relating to an order in which different types of data, which has not been explicitly requested by the mobile radio receiver, are to be transmitted to the mobile radio receiver when a push operation is performed, such that different types of push service data transmitted from an application computer and buffered in a storage area of the transmission network, and which has not been explicitly requested by the mobile radio receiver, are forwarded to the mobile radio receiver in the order indicated by the mobile radio receiver to the transmission network,
   wherein the transmission network includes a network computer for initiating the transmission of the push service data, which has not been explicitly requested by the mobile radio receiver, to the mobile radio receiver, and
   wherein the initiation is performed depending on the information indicated by the mobile radio receiver.

8. The method for transmitting data as claimed in claim 7, wherein the information indicates to the transmission network a time when the data, which has not been explicitly requested, is to be transmitted to the mobile radio receiver.

* * * * *